United States Patent [19]

Grey

[11] Patent Number: 5,305,934

[45] Date of Patent: Apr. 26, 1994

[54] TOOL AND EYEGLASS HOLDER

[76] Inventor: Marilyn Grey, 30 Fox Hollow Dr., Cherry Hill, N.J. 08003

[21] Appl. No.: 6,230

[22] Filed: Jan. 19, 1993

[51] Int. Cl.⁵ .................... A45C 13/30; A45F 3/14
[52] U.S. Cl. .................... 224/207; 224/202; 63/1.1; 81/3.5; 24/3 B; 24/3 C; 351/157
[58] Field of Search ............. 224/202, 205, 207, 257, 224/258; 206/5, 229, 230, 231, 234, 223; 63/1.1; 81/3.5, 177.4, 490; 248/902; 7/165, 167; 351/155, 156, 157; 24/3 C, 3 F, 3 G, 3 B

[56] References Cited

U.S. PATENT DOCUMENTS

| | | |
|---|---|---|
| 104,216 | 6/1870 | Sickels . |
| 562,416 | 6/1896 | Powers et al. ............ 7/165 |
| 1,404,866 | 1/1922 | Lahr .................... 7/165 |
| 1,486,294 | 3/1924 | Morris .................. 206/234 |
| 3,583,010 | 6/1971 | Woodrum ............... 81/3.5 |
| 4,674,298 | 6/1987 | Wimmershoff-Caplan . |
| 4,818,134 | 4/1989 | Tsai .................... 401/195 |
| 4,927,258 | 5/1990 | McKenna et al. ......... 351/156 |
| 4,938,581 | 7/1990 | Trickel ................. 351/156 |
| 4,984,683 | 1/1991 | Eller .................... 206/38 |
| 5,078,484 | 1/1992 | Vaughn ................. 351/51 |

FOREIGN PATENT DOCUMENTS

| | | |
|---|---|---|
| 1319413 | 1/1963 | France . |
| 86/02463 | 4/1986 | World Int. Prop. O. ...... 206/5 |

*Primary Examiner*—Linda J. Sholl
*Attorney, Agent, or Firm*—Panitch Schwarze Jacobs & Nadel

[57] ABSTRACT

A device for hanging a pair of eyeglasses about a neck of a user which includes an elongated flexible member for being positioned about the neck of the user. The elongated member has first and second terminal ends. A container having a generally hollow. interior cavity and an opening for accessing the cavity is secured to the first and second terminal ends of the elongated member. A tool is at least partially positioned within the cavity. The tool is sized to pass through the opening for allowing the user to access and use the tool. Spare parts can be housed within the cavity for use in repairing the pair of eyeglasses.

5 Claims, 1 Drawing Sheet

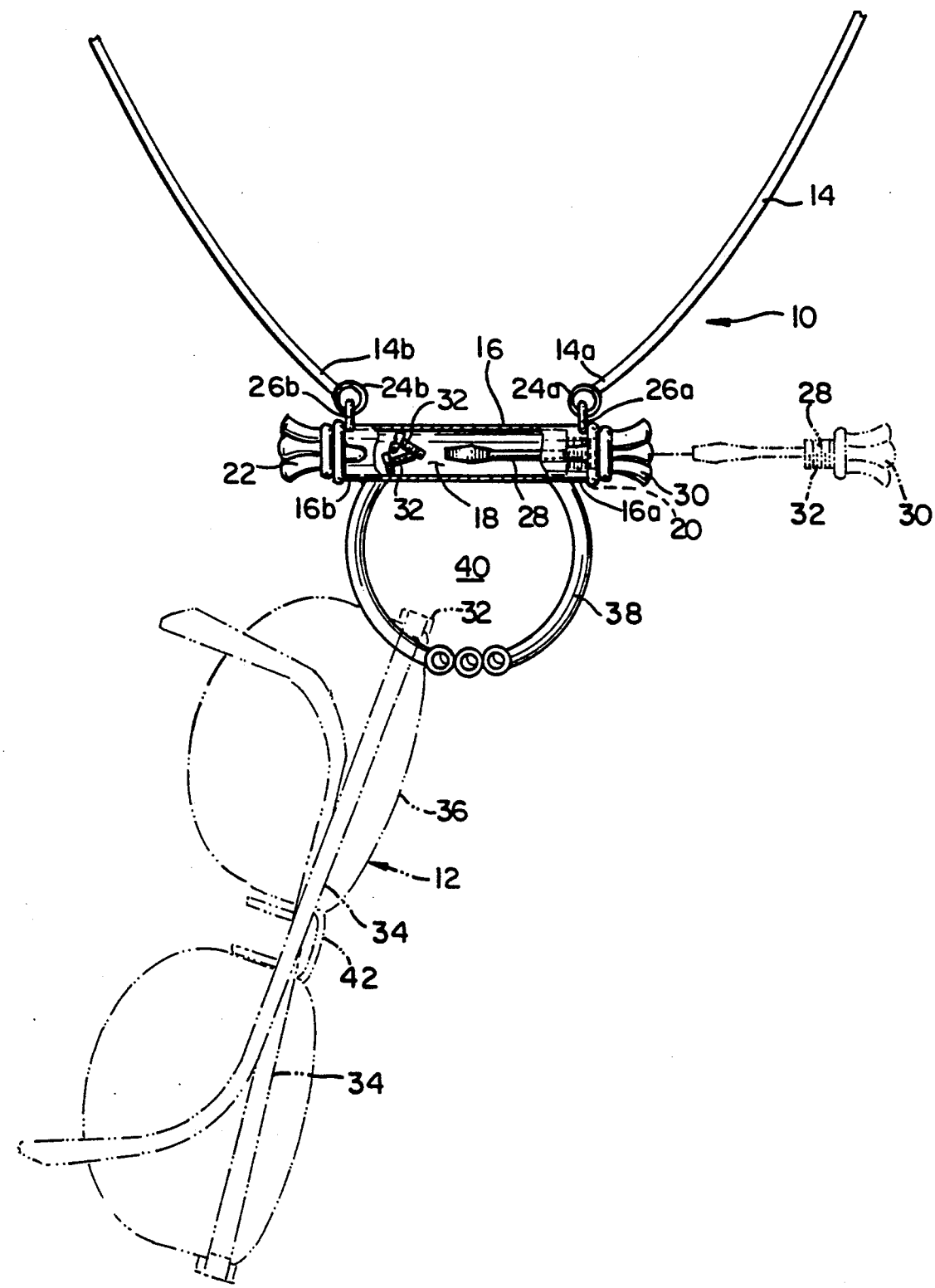

TOOL AND EYEGLASS HOLDER

FIELD OF THE INVENTION

The present invention relates to a holder for a pair of eyeglasses and, more particularly, to a holder for a pair of eyeglasses which includes a tool and spare parts for repairing the eyeglasses.

BACKGROUND OF THE INVENTION

A large majority of the people in the world today use eyeglasses, either for correction of vision or to reduce the intensity of light, that is, sunglasses. Most users of eyewear have frequent need to remove the eyewear and yet keep it conveniently located to be readily replaced back on the face of the user when needed. Users typically place their removed eyewear in their shirt pocket, in a container or purse, or lay the eyewear down on a convenient surface. Some hang eyewear from the neckline of their shirt by extending one of the temples inside the shirt, thereby hanging the eyewear on the front of the shirt.

All of these methods of storing eyewear have problems. Many shirts do not have pockets, or if they have pockets, when the user bends over the eyewear is in danger of slipping out. Purses or containers for eyewear are frequently not readily available when the user needs to make immediate use of his eyewear, and when the eyewear is laid on a nearby surface it frequently is misplaced or lost entirely.

Other known methods of retaining eyewear convenient to the user includes suspending the eyewear from a cord looped around the neck of the user. Such methods include various means of attaching the ends of the cord to the earpieces of the eyewear. These devices are not easily removable from the eyewear and, therefore, can become unsightly when the eyeglasses are worn by the user. That is, the cord often extends from the ears of the user where it is highly visible to others. Therefore, there is a need for a device for hanging a pair of eyeglasses about the neck of a user which can be readily disconnected from the eyeglasses when it is desired to use the eyeglasses.

Conventional devices for retaining eyewear convenient to the user are one dimensional. That is, the devices are typically confined to the purpose of retaining the eyewear on the user and provide no other function. It is well known that eyeglasses are generally fragile and are susceptible to breakage at inconvenient times. It is not unusual for the screws which retain the temples on the front of the eyeglasses to become loose and/or lost without warning. In such events, the user must continue to wear the eyeglasses with only a single temple or fashion some type of other temporary fastener, such as tape, which is not esthetically pleasing until appropriate repair can be effected. Therefore, there is a need for a device for hanging a pair of glasses about the neck of a user which includes a tool and spare screws for repairing the eyeglasses in the event that a screw for pivotally connecting the temple and front of the eyeglasses is loose and/or lost.

The present invention overcomes many of the disadvantages inherent in the above-described eyewear retaining devices by providing a device for releasably hanging a pair of eyeglasses about a neck of a user which includes a tool and spare parts for repairing the eyeglasses in the event of breakage. The device for hanging a pair of eyeglasses of the present invention includes a small screwdriver and spare screws for repairing the eyeglasses. The screwdriver and screws are hidden from view during normal use of the device and, therefore, do not hinder the esthetically pleasing appearance of the device of the present invention. Consequently, use of the present invention enables a user of a pair of eyeglasses to readily repair the eyeglasses, even when the eyeglasses need repair at an inconvenient time.

SUMMARY OF THE INVENTION

Briefly stated, the present invention is directed to a device for supporting a pair of eyeglasses about a neck of a user. The device includes an elongated flexible member for being positioned about the neck of the user. The elongated member has first and second terminal ends. A container having a generally hollow interior cavity and an opening for accessing the cavity is provided. The first and second terminal ends of the elongated member are secured to the container. A tool is at least partially positioned within the cavity. The tool is sized to pass through the opening to allow the user to access and use the tool.

In another embodiment, the present invention is a device for supporting a pair of eyeglasses on a user. The device includes a container having a generally hollow interior cavity and an opening for accessing the cavity. A support means for supporting the container on the user is provided. A hanging means is secured to the container for releasably receiving at least a portion of the eyeglasses to support the eyeglasses on the device. A tool is at least partially positioned within the cavity. The tool is sized to pass through the opening to allow the user to access and use the tool.

BRIEF DESCRIPTION OF THE DRAWING

The foregoing summary, as well as the following detailed description, will be better understood when read in conjunction with the appended drawing. For the purpose of illustrating the invention there is shown an embodiment which is presently preferred, it being understood, however, that this invention is not limited to the precise arrangement and instrumentality shown. In the drawing:

The Figure is a front elevational view, partially in cross-section and partially broken away, of a device for hanging a pair of glasses about a neck of a user in accordance with the present invention.

DESCRIPTION OF THE PREFERRED EMBODIMENT

Certain terminology is used in the following description for convenience only and it is not limiting. The words "right," "left," "lower" and "upper" designate directions in the drawings to which reference is made. The words "inwardly" and "outwardly" refer to directions toward and away from, respectively, the geometric center of the device and designated parts thereof. The terminoloy includes the words above specifically mentioned, derivatives thereof and words of similar import.

Referring to the drawing in detail, there is shown in the Figure a preferred embodiment of a device, generally designated 10, for hanging a pair of eyeglasses 12 (shown in phantom) about a neck of a user (not shown) in accordance with the present invention. The device 10 includes an elongated flexible member 14 for being positioned about the neck of the user. The elongated member 14 includes first and second terminal ends 14a, 14b. In the present embodiment, it is preferred that the elongated member 14 be a flexible cord, constructed of nylon or other similar material. However, it is understood by those skilled in the art that the elongated member could be constructed of other materials, such as precious metals, including gold or silver to provide the device 10 with an esthetically pleasing appearance.

While it is preferred that the device 10 be secured about a neck of a user, it is understood by those skilled in the art that the elongated member 14 could be suspended about or over other items, such as a hook secured to a wall (not shown) without departing from the spirit and scope of the invention.

As shown in the Figure, the device 10 includes a container 16 which has a generally hollow interior cavity 18 and an opening 20 for accessing the cavity 18. In the present embodiment, the container 16 is generally cylindrically shaped and is generally annular in cross section. However, it is understood by those skilled in the art that the present invention is not limited to configuring the container 16 in any particular geometrical shape. That is, the container 16 could be generally square in cross section or generally oval in cross section.

The container 16 includes a first end 16a and a second end 16b. The first end 16a of the container 16 includes the opening 20 therethrough. The second end 16b is generally closed and includes an ornamental end knob 22 for providing the container 16 with an overall esthetically pleasing appearance. The first and second terminal ends 14a, 14b of the elongated member 14 are preferably secured to the first and second ends 16a, 16b of the container 16, respectively. In the present embodiment, it is preferred that the first and second ends 14a, 14b of the elongated member 14 be configured generally in the form of a loop 24a, 24b, respectively. Similarly, the first and second ends 16a, 16b of the container 16 each include a loop 26a, 26b, respectively, extending therefrom. The loop 26a on the first end 16a of the container 16 and the loop 24a on the first end 14a of the elongated member 14 are interlocked to secure the first end 14a of the elongated member 14 to the container 16. Similarly, the loop 26b on the second end 16b of the container 16 is interlocked with the loop 24b on the second end 14b of the elongated member 14. The manner of interlocking the loops 24a, 24b and 26a, 26b is well known to those of ordinary skill in the jewelry art and, therefore, further description thereof is omitted for purposes of convenience only and is not limiting.

However, it is understood by those skilled in the art that the first and second ends 14a, 14b of the elongated member 14 could be secured to the first and second ends 16a, 16b of the container 16 in any manner without departing from the spirit and scope of the invention. For instance, the first and second ends 14a, 14b of the elongated member 14 could omit the loops 24a, 24b and pass directly through the loops 26a, 26b on the container 16 and be crimped back onto the elongated member 14 in a manner well understood by those skilled in the art.

As shown in the Figure, a tool 28 is at least partially positioned within the cavity 18. The portion of the tool 28 positioned within the cavity 18 is sized to pass through the opening 20 for allowing the user to access and use the tool 28. In the present embodiment, the tool 28 is comprised of a screwdriver which includes a handle 30 releasably secured to the container 16 within the opening 20. More particularly, it is preferred that the handle 30 be threadably secured to the interior wall of the container 16 defined by the cavity 18 by a standard thread connection. As best shown in phantom in the Figure, the tool 28 includes a threaded portion 32 which is threadably secured to the container 16. The handle 30 has a structure similar to that of the knob 22.

It is understood by those skilled in the art that the present invention is not limited to securing a screwdriver to the container 16. There could be other tools secured to the container 16, such as a miniature pair of pliers or wire cutters (not shown), without departing from the spirit and scope of the invention.

The device 10 further includes at least one spare part 32 positioned within the cavity 18 for use in repairing the pair of eyeglasses 12. In the present embodiment, it is preferred that the spare part 32 be comprised of at least a pair of screws, each screw for securing the temple 34 to the front 36 of the eyeglasses 12 in a manner well understood by those skilled in the art. It is understood that the present invention is not limited to positioning screws within the cavity 18 of the container 16. Other spare parts could be positioned within the cavity, such as spare nose pads (not shown) or tightening bands (not shown), without departing from the spirit and scope of the invention.

The device further includes hanging means secured to the container 16 for releasably receiving at least a portion of the eyeglasses 12 to secure the eyeglasses 12 to the device 10 about the neck of the user. In the present embodiment, it is preferred that the hanging means comprise a loop member 38 extending from the container 16 and defining an aperture 40 for receiving a temple 34 of the pair of eyeglasses 12 therethrough to thereby hang the pair of eyeglasses 12 on the device 10. In the present embodiment, it is preferred that the loop member 38 be generally semicircular and be formed as part of the container 16. It is also understood that the loop member 38 could be configured in other geometric shapes, such as generally square or triangular, without departing from the spirit and scope of the invention. Further, the loop member 38 could extend from the elongated member 14, as opposed to the container 16, without departing from the spirit and scope of the invention.

It is preferred that the container 16 and loop member 38 be constructed of a polymeric material and be formed by a molding process, as is well understood by those skilled in the art. The present invention is not limited to constructing the container and loop member 16, 38 of a polymeric material, and other materials, such as precious metals, could be used without departing from the spirit and scope of the invention.

While it is preferred that the container 16 be supported on the user by the elongated member 14, it is understood by those skilled in the art that any support means could be used to support the container 16 on the user, including a pin (not shown).

In use, the elongated member 14 is positioned about a neck of a user. When the user decides to remove and temporarily store the pair of eyeglasses 12, the eyeglasses 12 can be hung from the device 10 by positioning one of the temples 34 through the aperture 40 of the loop member 38 to thereby hang the eyeglasses 12 from the device 10, as shown in the Figure. To again use the eyeglasses 12, the user simply removes the temple 34 from the loop 38.

In the event that a screw 32 from the eyeglasses 12 is lost or misplaced, the user can conveniently remove the tool 28 from the container 16 by rotating the handle 30 with respect to the container 16 to unthread the handle 30 therefrom. Once the tool 28 is removed from the container 16, the screws 32 are accessible and can be used to repair the eyeglasses 12, in a manner well understood by those skilled in the art. Upon completion of the repair, the tool 28 can then be repositioned within the container 16 by rotating the handle 30 with respect to the container 16.

It is understood by those skilled in the art that the present invention is not limited to the embodiment disclosed in the Figure. For instance, the loop member 38 could be omitted and the eyeglasses 12 could simply be hung over the elongated member 14 or container 16. Similarly, the entire tool 28 could be positioned within the container 16 and an end cap (not shown) could be secured to the container 16 at the opening 20. Furthermore, a clip could extend from the container 16 for receiving the bridge 42 of the eyeglasses 12 in a manner well understood by those skilled in the art.

From the foregoing description, it can be seen that the present invention comprises a device for hanging a pair of eyeglasses about a neck of a user. It will be appreciated by those skilled in the art that changes and modifications may be made to the above-described embodiment without departing from the inventive concept thereof. It is understood, therefore, that the present invention is not limited to the particular embodiment disclosed, but it is intended to include all modifications and changes which are within the scope and spirit of the invention as defined by the appended claims.

I claim:

1. A device for supporting a pair of eyeglasses about a neck of a user, said device comprising:
   an elongated flexible member for being positioned about the neck of the user, said elongated member having first and second terminal ends;
   a container having a generally hollow interior cavity and an opening for accessing said cavity, said first and second terminal ends of said elongated member being secured to said container;
   a tool at least partially positioned within said cavity, said tool being sized to pass through said opening for allowing the user to access and use said tool; and
   a loop member, separate from said elongated flexible member, extending from said container and defining an aperture for receiving a temple of the pair of eyeglasses therethrough to thereby support the pair of eyeglasses on the device.

2. The device as recited in claim 1 wherein said tool includes a handle releasably secured to said container within said opening.

3. The device as recited in claim 2 wherein said tool is a screwdriver and said handle is threadably secured within said container opening.

4. The device as recited in claim 1 further including at least one spare part within the cavity for use in repairing the pair of eyeglasses.

5. The device as recited in claim 4 wherein the spare part is a screw.

* * * * *